US012624768B2

(12) United States Patent
Pfeiffer

(10) Patent No.: US 12,624,768 B2
(45) Date of Patent: May 12, 2026

(54) PRESSURE RELIEF VALVE

(71) Applicant: Wolf Tooth Components, LLC, Burnsville, MN (US)

(72) Inventor: Michael W. Pfeiffer, Burnsville, MN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 0 days.

(21) Appl. No.: 18/893,936

(22) Filed: Sep. 23, 2024

(65) Prior Publication Data

US 2025/0102071 A1 Mar. 27, 2025

Related U.S. Application Data

(60) Provisional application No. 63/539,814, filed on Sep. 21, 2023.

(51) Int. Cl.
F16K 17/04 (2006.01)
B62J 1/08 (2006.01)

(52) U.S. Cl.
CPC .............. F16K 17/0406 (2013.01); B62J 1/08 (2013.01)

(58) Field of Classification Search
CPC ...... F15B 15/222; B62J 1/08; B62J 2001/085; B62J 1/00–10; F16K 17/0406
See application file for complete search history.

(56) References Cited

U.S. PATENT DOCUMENTS

| | | | |
|---|---|---|---|
| 3,496,838 A | 2/1970 | Barrett et al. | |
| 4,720,085 A | 1/1988 | Shinbori et al. | |
| 5,301,974 A | * 4/1994 | Knapp | ................... B62K 21/20 267/221 |
| 5,461,965 A | * 10/1995 | Schwaegerle | ............ A47C 3/30 188/315 |
| 7,673,936 B2 | 3/2010 | Hsu | |
| 8,016,349 B2 | 9/2011 | Mouri et al. | |
| 8,177,251 B2 | 5/2012 | Shirai | |
| 8,191,964 B2 | 6/2012 | Hsu | |
| 8,302,983 B1 | 11/2012 | Hsu | |
| 8,308,124 B2 | 11/2012 | Hsu | |
| 8,596,663 B2 | 12/2013 | Shirai | |
| 8,950,771 B2 | 2/2015 | Felsl et al. | |
| 9,027,434 B2 | 5/2015 | Neeley | |
| 9,126,647 B2 | 9/2015 | Kuo | |
| 9,157,523 B2 | 10/2015 | Miki et al. | |
| 9,242,688 B2 | 1/2016 | McAndrews et al. | |

(Continued)

FOREIGN PATENT DOCUMENTS

| | | |
|---|---|---|
| EP | 1799535 | 4/2013 |
| EP | 3290311 | 3/2018 |

(Continued)

*Primary Examiner* — Jessica Cahill

(74) *Attorney, Agent, or Firm* — Dicke, Billig & Czaja, PLLC

(57) ABSTRACT

A pressure relief valve for a height adjustment seat post including a lower housing, a stanchion telescopically supported within the lower housing, and a cartridge including a piston rod driven by a piston to telescopically adjust the stanchion relative to the lower housing includes a pressure relief port in the piston of the height adjustment seat post, a pressure relief valve ball, and a pressure relief valve spring to bias the pressure relief valve ball to a closed position to close the pressure relief port.

9 Claims, 8 Drawing Sheets

(56)     References Cited

U.S. PATENT DOCUMENTS

| | | | | |
|---|---|---|---|---|
| 9,580,124 | B2 * | 2/2017 | Shirai | B62K 19/36 |
| 10,933,935 | B2 | 3/2021 | Jordan | |
| 11,180,212 | B2 * | 11/2021 | Shirai | F15B 15/16 |
| 11,724,760 | B2 | 8/2023 | Jordan | |
| 2003/0034596 | A1 * | 2/2003 | Barefoot | F16F 9/0209 |
| | | | | 188/282.1 |
| 2006/0066074 | A1 | 3/2006 | Turner | |
| 2009/0108642 | A1 | 4/2009 | Hsu | |
| 2011/0257848 | A1 | 10/2011 | Shirai | |
| 2012/0104221 | A1 | 5/2012 | Hsu | |
| 2012/0243931 | A1 | 9/2012 | Hsu | |
| 2013/0093231 | A1 | 4/2013 | Hsu | |
| 2013/0221713 | A1 * | 8/2013 | Pelot | G05B 15/02 |
| | | | | 297/215.13 |
| 2014/0013875 | A1 | 1/2014 | Neeley | |
| 2015/0034779 | A1 | 2/2015 | McAndrews et al. | |
| 2015/0232142 | A1 | 8/2015 | Shirai | |
| 2017/0106928 | A1 * | 4/2017 | Madau | F16F 9/52 |
| 2017/0211653 | A1 * | 7/2017 | Zuo | F16F 9/5165 |
| 2017/0363120 | A1 | 12/2017 | Stander | |
| 2019/0233041 | A1 * | 8/2019 | Watson | B62J 1/28 |
| 2019/0301497 | A1 | 10/2019 | Jordan | |
| 2021/0179218 | A1 | 6/2021 | Jordan | |
| 2023/0382481 | A1 | 11/2023 | Jordan | |
| 2025/0042490 | A1 * | 2/2025 | Dunlap | B62J 1/08 |

FOREIGN PATENT DOCUMENTS

| | | | | |
|---|---|---|---|---|
| EP | 3290311 A1 * | 3/2018 | | F15B 15/202 |
| WO | 2016029301 | 3/2016 | | |
| WO | 2016113673 | 7/2016 | | |

* cited by examiner

DEFAULT STATE – VALVE CLOSED

PRESSURE RELIEF STATE – VALVE OPEN

PRESSURE RELIEF VALVE

CROSS-REFERENCE TO RELATED APPLICATIONS

This application claims priority under 35 U.S.C. 119(e) to U.S. Provisional Patent Application Ser. No. 63/539,814 filed on Sep. 21, 2023, and incorporated herein by reference. In this instance, the day that is 12 months after the filing date of the provisional application falls on a Saturday (i.e., Saturday, Sep. 21, 2024). As such, the period of pendency of the provisional application is extended to the next succeeding business day (i.e., Monday, Sep. 23, 2024). See 35 U.S.C. 119(e)(3).

BACKGROUND

The present disclosure relates generally to a pressure relief valve and, more specifically, relates to a pressure relief valve for a height adjustment seat post for a saddle of a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
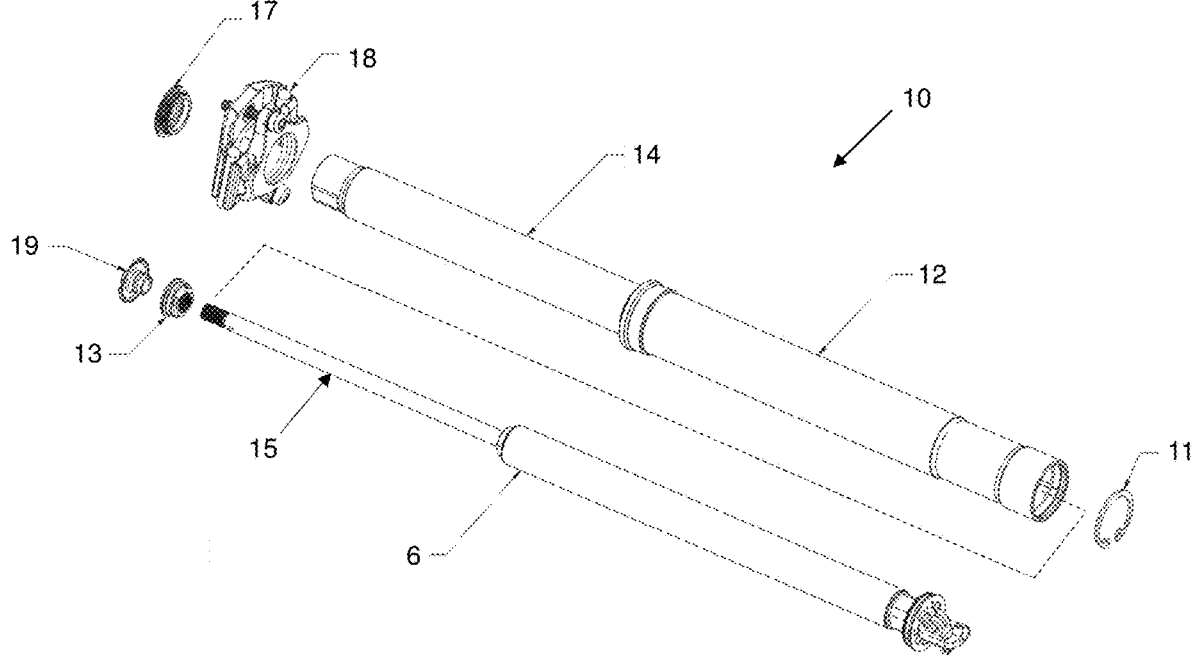
FIGS. 1, 2, 3 illustrate an example of a height adjustment seat post in accordance with the present disclosure.
Figure 2:
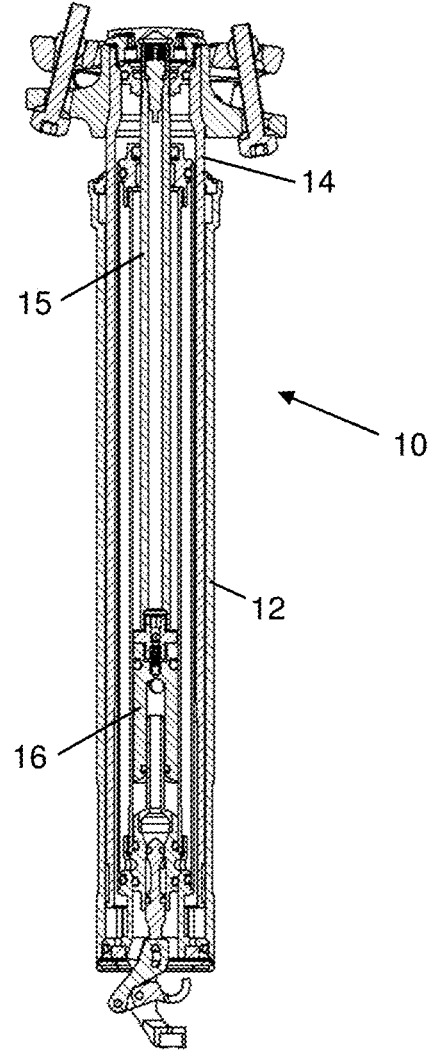
Figure 3:
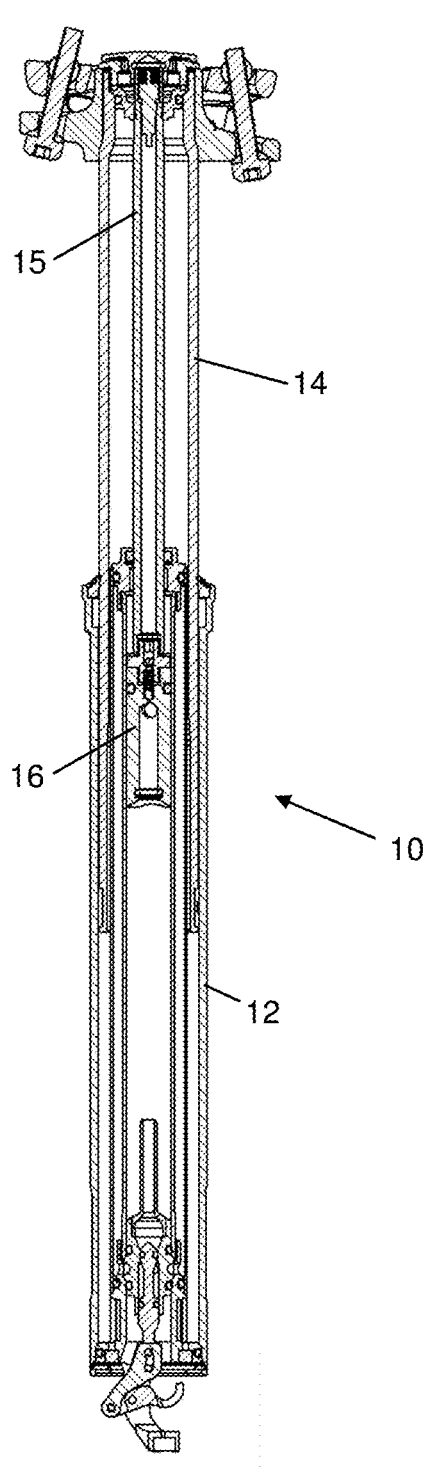

FIGS. 1, 2, 3 illustrate an example of a height adjustment seat post 10 for a saddle of a bicycle in accordance with the present disclosure. In examples, the height adjustment seat post 10 includes a lower housing 12, a stanchion 14 telescopically supported within the lower housing 12, and a cartridge 6 supported within the lower housing 12 and the stanchion 14 to telescopically adjust the stanchion 14 relative to the lower housing 12. In examples, the cartridge 6 includes a piston 16 and a piston rod 15 driven by the piston 16 to telescopically adjust the stanchion 14 relative to the lower housing 12. In examples, a saddle clamp assembly 18 is secured to the stanchion 14, for example, by a lock ring 17, to support a saddle for a bicycle (such as, for example, the saddle 20 for the bicycle 1 of FIG. 8). In examples, an end of the cartridge 6 is retained within the lower housing 12 by a snap ring 11, and an end of the piston rod 15 is secured to an end of the stanchion 14 by an upper cap 13. In examples, an air cap 19 covers the end of the height adjustment seat post 10.

FIGS. 4, 5, 6, 7a, 7b illustrate an example of a pressure relief valve 100 for a height adjustment seat post in accordance with the present disclosure, such as, for example, the height adjustment seat post 10. In examples, the pressure relief valve 100 includes a pressure relief port 161 in a piston 160 of the height adjustment seat post (e.g., the piston 16 of the height adjustment seat post 10), a pressure relief valve ball 120, and a pressure relief valve spring 140 to bias the pressure relief valve ball 120 to a closed position to close the pressure relief port 161 in the piston 160. In examples, the pressure relief port 161 is provided in a center of the piston 160.

In examples, the piston 160 is positioned within a cylinder 62 of a cartridge 60 of the height adjustment seat post (e.g., the cartridge 6 of the height adjustment seat post 10), and a piston seal O-ring 65 provides a seal between the piston 160 and a cylinder wall 63 of the cylinder 62. In examples, a reservoir 64 is provided between the cylinder wall 63 of the cylinder 62 and a housing 61 of the cartridge 60. In examples, a cylinder cap 66 caps an end of the cartridge 60 between the housing 61 and the cylinder wall 63.

In examples, a piston rod 150 of the height adjustment seat post (e.g., the piston rod 15 of the height adjustment seat post 10) extends from the piston 160. In examples, a piston rod coupler 170 couples the piston rod 150 with the piston 160.

In examples, the pressure relief port 161 is communicated with the cylinder 62 of the cartridge 60 of the height adjustment seat post (e.g., the cartridge 6 of the height adjustment seat post 10) such that increased pressure (fluid pressure) in the cylinder 62 (Pcylinder>Pcritical) forces the pressure relief valve ball 120 to an open position (against a bias force of the pressure relief valve spring 140) to open the pressure relief port 161 in the piston 160 and release the increased pressure. In examples, the increased pressure is released by releasing fluid (oil) in the cylinder 62 through the pressure relief port 161 in the piston 160 to the reservoir 64 within the cartridge 60 of the height adjustment seat post (e.g., the cartridge 6 of the height adjustment seat post 10).

Figure 4:
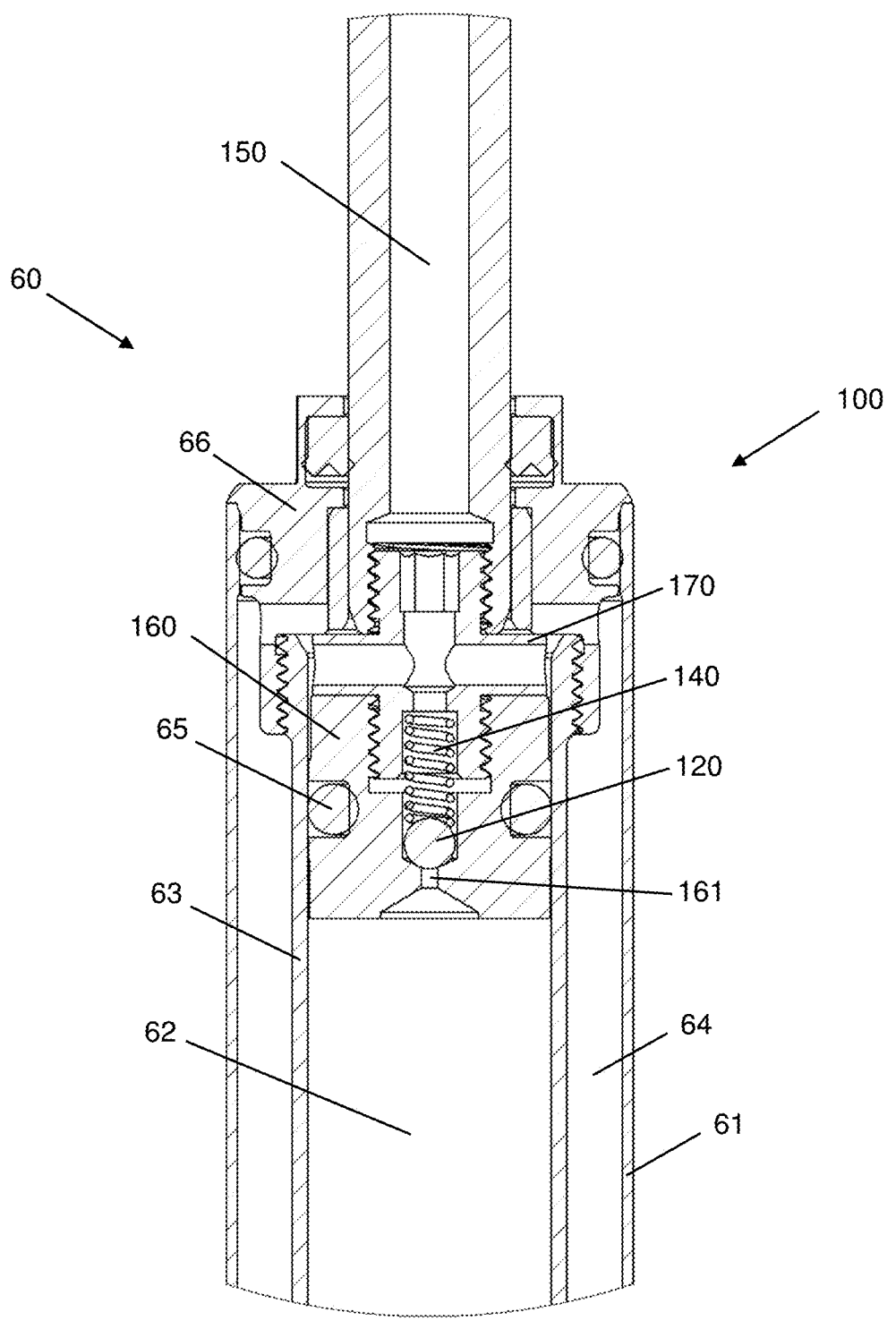
FIGS. 4, 5, 6, 7a, 7b illustrate an example of a pressure relief valve for a height adjustment seat post in accordance with the present disclosure.

In examples, as illustrated in the example of FIG. 4, in a default state, the pressure relief valve 100 is closed. More specifically, in examples, the pressure relief valve ball 120 is biased to the closed position by the pressure relief valve spring 140 to close the pressure relief port 161 in the piston 160.

Figure 5:
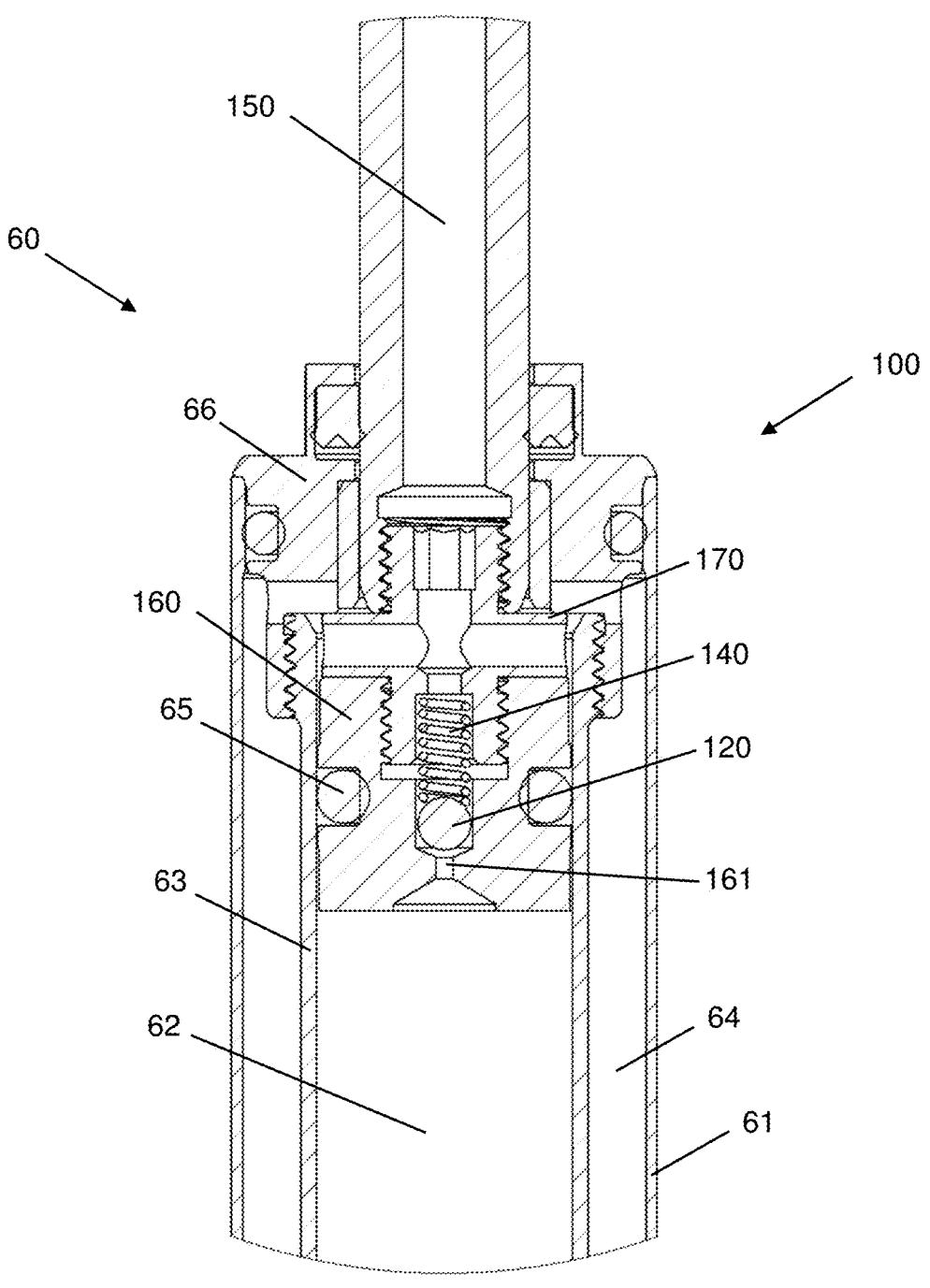

In examples, as illustrated in the example of FIG. 5, in a pressure relief state, the pressure relief valve 100 is open. More specifically, in examples, the pressure relief valve ball 120 is forced to the open position (against the bias force of the pressure relief valve spring 140) by increased pressure (fluid pressure) in the cylinder 62 (Pcylinder>Pcritical) to open the pressure relief port 161 in the piston 160.

Figure 6:
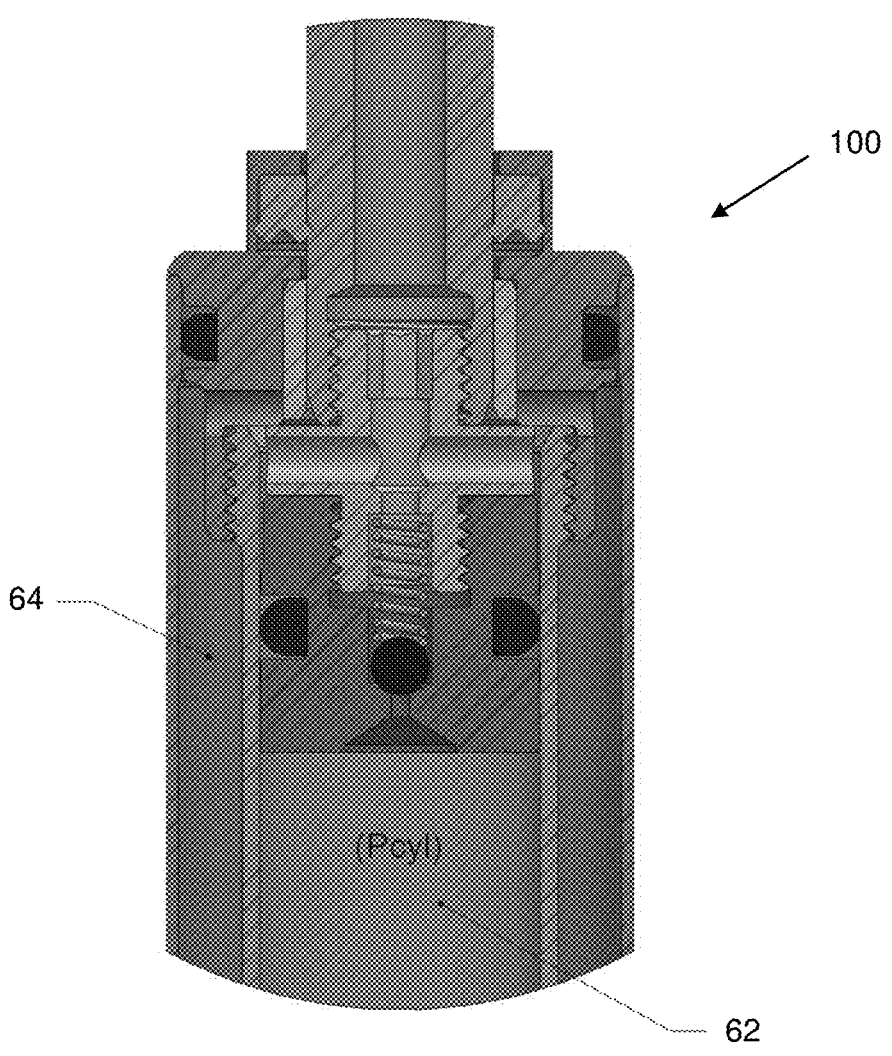

In examples, with reference to the example of FIG. 6, with a height adjustment seat post for a saddle of a bicycle in accordance with the present disclosure, such as, for example, the height adjustment seat post 10, a column of fluid inside the cylinder 62 supports the weight of a rider. In examples, pressure of fluid inside the cylinder (Pcyl) will increase as load on the saddle increases. In examples, excessive pressure within the cylinder 62 could potentially damage components. To help avoid this, in examples, once the pressure of fluid inside the cylinder (Pcyl) reaches a critical pressure (Pcrit), the pressure relief valve 100 will open, allowing fluid to escape into the reservoir 64. In examples, excessive pressure within the cylinder 62 could result from load spike on the saddle, or due to thermal expansion of fluid inside the cylinder 62.

Figures 7A, 7B:
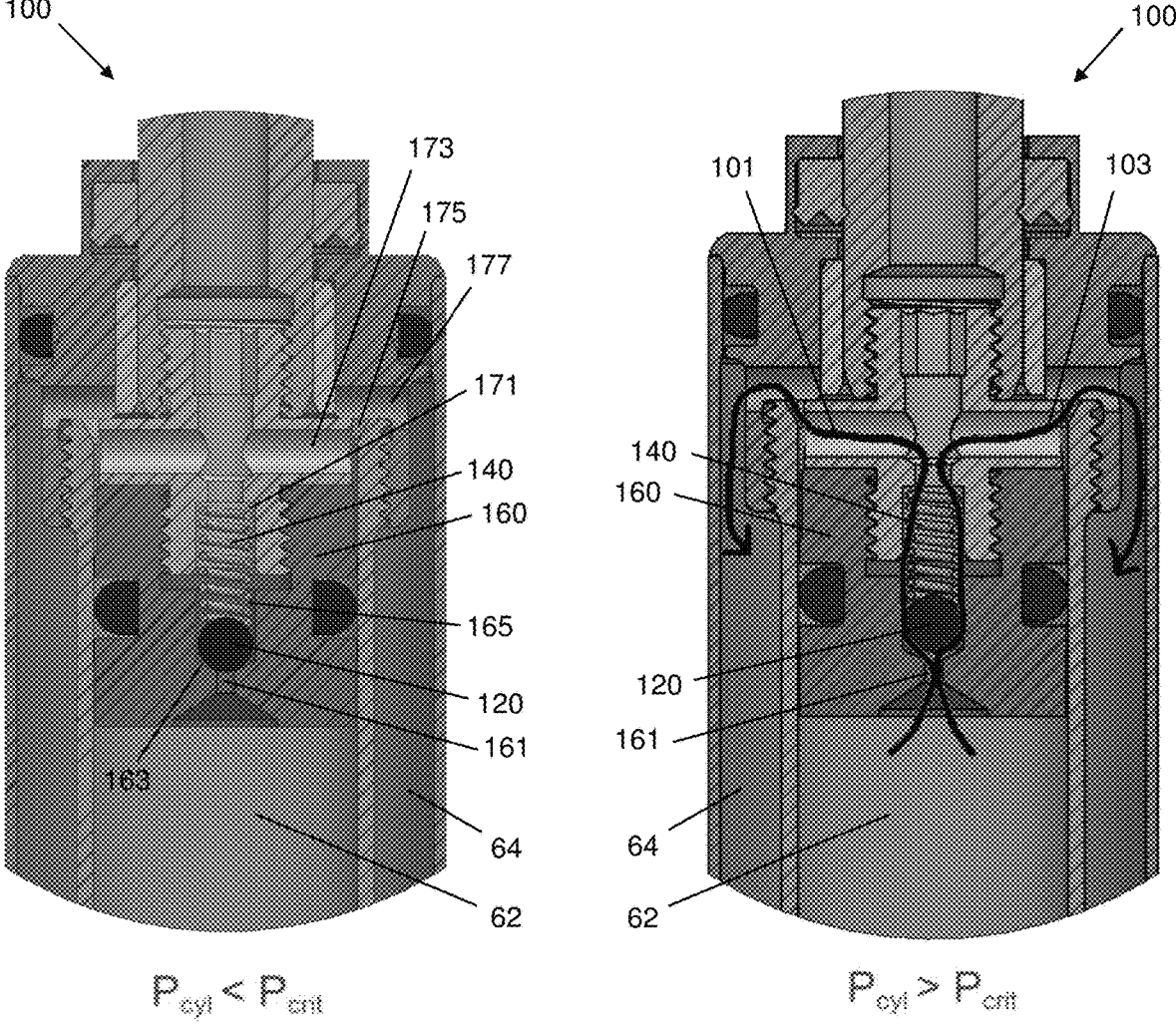

In examples, as illustrated in the example of FIG. 7a, pressure of fluid inside the cylinder (Pcyl) is less than the critical pressure (Pcrit). As such, the pressure relief valve 100 is in the closed position. More specifically, in examples, the pressure relief valve ball 120 is biased to the closed position by the pressure relief valve spring 140 to close the pressure relief port 161 in the piston 160.

In examples, as illustrated in the example of FIG. 7*b*, pressure of fluid inside the cylinder (Pcyl) is greater than the critical pressure (Pcrit). As such, the pressure relief valve 100 is in the open position. More specifically, in examples, the pressure relief valve ball 120 is forced to the open position (against the bias force of the pressure relief valve spring 140) to open the pressure relief port 161 in the piston 160. Accordingly, in examples, pressure within the cylinder 62 is released by releasing fluid (oil) in the cylinder 62 through the pressure relief port 161 in the piston 160 to the reservoir 64.

In examples, as illustrated by arrows 101 and 103 in the example of FIG. 7*b*, and with reference to the example of FIG. 7*a*, pressure within the cylinder 62 is released by releasing fluid (oil) in the cylinder 62 to the reservoir 64 through the pressure relief port 161 in the piston 160, through a seat 163 for the pressure relief valve ball 120 in the piston 160, around the pressure relief valve ball 120, through a seat 165 for the pressure relief valve spring 140 in the piston 160, through a seat 171 for the pressure relief valve spring 140 in the piston rod coupler 170, through one or more than one passage 173 in the piston rod coupler 170, through a passage 175 between the piston rod coupler 170 and the cylinder wall 63, and through one or more than one passage 177 in the cylinder cap 66 to the reservoir 64.

Figure 8:
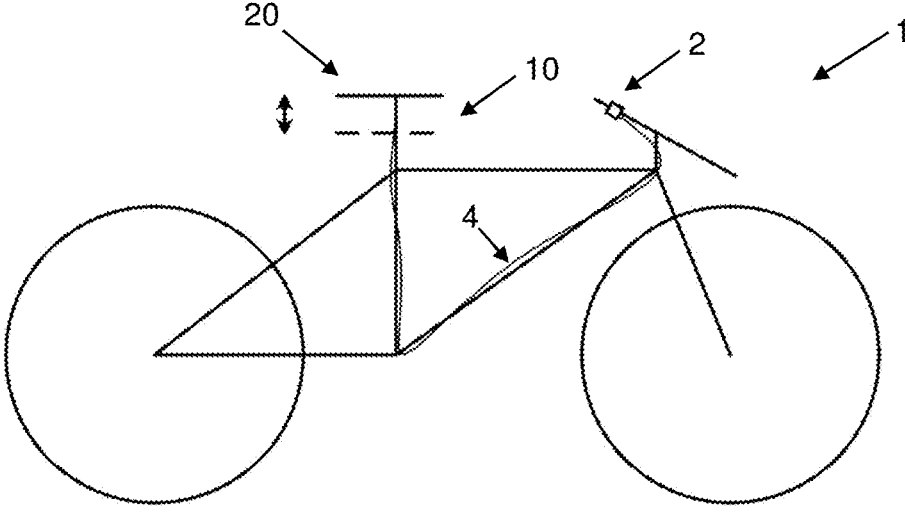
FIG. 8 illustrates an example implementation of a pressure relief valve for a height adjustment seat post for a saddle of a bicycle in accordance with the present disclosure.

FIG. 8 illustrates an example implementation of a pressure relief valve for a height adjustment seat post for a saddle of a bicycle 1 in accordance with the present disclosure, such as, for example, the height adjustment seat post 10 for the saddle 20. In examples, a control device 2 may be mounted on a bicycle (e.g., a handlebar of a bicycle), such that operation or actuation of the control device 2 may be used to apply pull to an actuation or control cable 4 coupled with a height adjustment seat post for a saddle of a bicycle, such as, for example, the height adjustment seat post 10 for the saddle 20. In examples, the height adjustment seat post includes a pressure relief valve in accordance with the present disclosure, such as, for example, the pressure relief valve 100.

A pressure relief valve as disclosed herein, such as, for example, the pressure relief valve 100, provides for release (controlled release) of increased pressure within a height adjustment seat post for a saddle of a bicycle, such as, for example, the height adjustment seat post 10, to avoid potential damage to components of the height adjustment seat post.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A pressure relief valve for a height adjustment seat post including a lower housing, a stanchion telescopically supported within the lower housing, and a cartridge including a piston rod driven by a piston to telescopically adjust the stanchion relative to the lower housing, the pressure relief valve comprising;

a pressure relief port in the piston of the height adjustment seat post;

a pressure relief valve ball; and a pressure relief valve spring to bias the pressure relief valve ball to a closed position to close the pressure relief port, wherein the piston is positioned within a cylinder of the cartridge.

2. The pressure relief valve of claim 1, wherein:

the pressure relief valve ball to be forced to an open position against a bias force of the pressure relief valve spring to open the pressure relief port.

3. The pressure relief valve of claim 1, wherein:

in a default state, the pressure relief valve is closed.

4. The pressure relief valve of claim 1, wherein:

in a pressure relief state, the pressure relief valve is open.

5. The pressure relief valve of claim 1, wherein:

with pressure in the cylinder being less than a critical pressure, the pressure relief valve is closed, and with pressure in the cylinder being greater than the critical pressure, the pressure relief valve is open.

6. The pressure relief valve of claim 1, wherein:

the pressure relief valve ball to be forced to an open position by pressure in the cylinder to open the pressure relief port.

7. The pressure relief valve of claim 1, wherein:

the pressure relief port to release pressure in the cylinder to a reservoir within the cartridge.

8. The pressure relief valve of claim 7, wherein:

pressure within the cylinder is released to the reservoir through the pressure relief port in the piston, through a seat for the pressure relief valve ball in the piston, around the pressure relief valve ball, and through a seat for the pressure relief valve spring in the piston.

9. The pressure relief valve of claim 7, wherein:

the reservoir is provided between a cylinder wall of the cylinder and a housing of the cartridge.

\* \* \* \* \*